(12) United States Patent
Fung-A-Wing

(10) Patent No.: US 11,039,698 B2
(45) Date of Patent: Jun. 22, 2021

(54) PORTABLE AND COLLAPSIBLE PRIVACY SHIELD

(71) Applicant: Rekemo Chantal Fung-A-Wing, Marietta, GA (US)

(72) Inventor: Rekemo Chantal Fung-A-Wing, Marietta, GA (US)

(*) Notice: Subject to any disclaimer, the term of this patent is extended or adjusted under 35 U.S.C. 154(b) by 289 days.

(21) Appl. No.: 15/975,085

(22) Filed: May 9, 2018

(65) Prior Publication Data

US 2018/0325289 A1 Nov. 15, 2018

Related U.S. Application Data

(60) Provisional application No. 62/505,909, filed on May 13, 2017.

(51) Int. Cl.
*B62B 9/14* (2006.01)
*A47G 5/00* (2006.01)
*A47C 21/00* (2006.01)

(52) U.S. Cl.
CPC .............. *A47G 5/00* (2013.01); *A47C 21/00* (2013.01); *B62B 9/142* (2013.01)

(58) Field of Classification Search
CPC .......... A47C 21/00; A47G 5/00; B62B 9/142; B62B 9/26; B62B 9/14; B62B 9/24; E06B 9/24; E06B 2009/2482; E06B 2009/2488; E06B 9/52
See application file for complete search history.

(56) References Cited

U.S. PATENT DOCUMENTS

| | | | | |
|---|---|---|---|---|
| 3,675,667 A | * | 7/1972 | Miller ..................... | E04H 15/40 135/126 |
| 3,960,161 A | * | 6/1976 | Norman .................. | E04H 15/18 135/126 |
| 5,137,044 A | * | 8/1992 | Brady ..................... | E04H 15/40 135/126 |
| 5,645,096 A | * | 7/1997 | Hazinski ................. | E04H 15/40 135/115 |
| 6,068,322 A | * | 5/2000 | Kuester .................. | B62B 9/142 296/97.21 |
| 6,109,282 A | * | 8/2000 | Yoon ....................... | E04H 15/40 135/124 |

(Continued)

*Primary Examiner* — Daniel P Cahn
(74) *Attorney, Agent, or Firm* — Malloy & Malloy, P.L.; Robert M. Downey

(57) ABSTRACT

A privacy shield includes an arrangement of fabric panels including a top panel, a back panel and opposite side panels surrounding an interior privacy chamber. The top panel has a window with a movable flap cover for entry of light and viewing into the nursing chamber. Retractable drawstrings extending through seams of the panels allow for adjustment of the height and width of the nursing chamber. A skeletal frame member extends through a continuous sleeve along the peripheral edges of the fabric panels allowing the privacy shield to be collapsed under tension into a compact arrangement for transport and storage, and expanded in a "pop-open" action, wherein the frame member holds the arrangement of fabric panels taut in surrounding relation to the interior privacy chamber. An arrangement of straps with releasable fasteners allows the privacy shield to be secured to a baby stroller, chair or other structure.

8 Claims, 12 Drawing Sheets

(56) References Cited

U.S. PATENT DOCUMENTS

| | | | | |
|---|---|---|---|---|
| 6,213,191 B1 | * | 4/2001 | Nitzsche | A47B 83/001 108/50.11 |
| 6,224,073 B1 | * | 5/2001 | Au | B62B 9/142 280/47.38 |
| 6,595,227 B2 | * | 7/2003 | Le Gette | E04H 15/40 135/126 |
| 6,851,136 B2 | * | 2/2005 | Brereton | A47D 9/005 135/126 |
| 7,302,957 B2 | * | 12/2007 | Ross | E04H 15/40 135/117 |
| D646,741 S | * | 10/2011 | Akaka | D21/837 |
| 8,550,548 B2 | * | 10/2013 | Gibbons | B62B 9/142 297/184.13 |
| 8,667,626 B2 | * | 3/2014 | Zheng | A63H 33/006 446/227 |
| D763,391 S | * | 8/2016 | Xu | D21/837 |
| D778,383 S | * | 2/2017 | Xu | D21/837 |
| 9,644,390 B1 | * | 5/2017 | Garvens | E04H 15/02 |
| D820,169 S | * | 6/2018 | Eriksson | D12/133 |
| D828,788 S | * | 9/2018 | Zacard | D12/133 |
| D898,498 S | * | 10/2020 | Tong | D6/716.8 |
| 2003/0106577 A1 | * | 6/2003 | Martinez | A47C 7/66 135/125 |
| 2005/0121061 A1 | * | 6/2005 | Zheng | E04H 15/56 135/126 |
| 2005/0168006 A1 | * | 8/2005 | Darland | B62B 9/14 296/97.21 |
| 2005/0275257 A1 | * | 12/2005 | McGregor | B60N 2/2842 297/219.12 |
| 2009/0039685 A1 | * | 2/2009 | Zernov | A47C 29/006 297/16.2 |
| 2012/0311782 A1 | * | 12/2012 | Tricault | A47D 9/005 5/99.1 |
| 2016/0324324 A1 | * | 11/2016 | Wilkerson Altonen | A45B 23/00 |

* cited by examiner

PORTABLE AND COLLAPSIBLE PRIVACY SHIELD

BACKGROUND OF THE INVENTION

This non-provisional patent application is based on provisional patent application Ser. No. 62/505,909 filed May 13, 2017.

Field of the Invention

This invention relates to shield devices for providing personal privacy and, more particularly, to a portable and collapsible shield device that creates a compact and personal privacy chamber for various purposes such as nursing an infant, changing diapers or clothes, administering medical treatment or working on a computer device.

Discussion of the Related Art

Current privacy devices for nursing a baby are designed to attach to the mother, usually around the neck. Most nursing covers include a piece of fabric that is draped over the baby. Nursing covers of this type do not offer ample space for maneuvering and helping the infant latch. They also do not allow much air to flow through the blanket-like cover which makes babies hot and uncomfortable. Moreover, because of the draping nature of these blanket-like cover devices, they often touch the baby's face, which is uncomfortable and can cause the baby to pull it off and potentially expose the mom when breast feeding. Babies like to be comfortable and breathe easy so that they can get a chance to connect with their mom when they nurse. Because of the lack of space created by existing covers, babies often get the feeling of being smothered from breathing in a small enclosed cloth. Additionally, existing privacy covers make it difficult to periodically check on the baby because they create a dark environment, allowing little to no light to pass through the cover. While current privacy devices do cover a mother's chest from being exposed, they do not create an environment that is ideal for feeding.

Objects and Advantages of the Present Invention

Considering the forgoing, it is a primary object of the present invention to provide a portable privacy shield for nursing a baby, wherein the privacy shield creates a nursing chamber having an area that is large enough to allow the baby to maneuver freely as needed to latch to the mother's breast.

It is a further object of the present invention to provide a portable privacy shield for nursing a baby, wherein the privacy shield creates a nursing chamber having an area that is large enough to ensure complete privacy for the mother.

It is still a further object of the present invention to provide a portable and collapsible privacy shield which allows for sufficient airflow to prevent the baby from becoming too hot.

It is still a further object of the present invention to provide a portable privacy shield that provides a non-contacting enclosure to prevent the baby from reflexively pulling away from the mother's breast while feeding.

It is still a further object of the present invention to provide a portable privacy shield which allows for sufficient light transmission through the privacy shield and into the enclosed nursing chamber to enable the mother to determine when the baby has reached satiety.

It is still a further object of the present invention to provide a portable and collapsible privacy shield that is simple, convenient and provides for universal means of attachment to typical baby strollers to thereby enable mobility and storage of the privacy shield.

It is yet a further object of the present invention to provide a portable privacy shield for changing diapers or clothing.

It is yet a further object of the present invention to provide a portable privacy shield for administering medical treatment.

It is yet a further object of the present invention to provide a portable privacy shield for working on a computer device in a public location, such as in a coffee shop or on an airplane.

These and other objects and advantages of the present invention are more readily apparent with reference to the following detailed description taken in conjunction with the accompanying drawings.

SUMMARY OF THE INVENTION

The present invention is directed to a privacy shield that can be used to provide privacy when performing a variety of tasks. The privacy shield is particularly useful for providing privacy to a mother and child when nursing and changing. The privacy shield includes an arrangement of fabric panels including a top panel and opposite side panels surrounding an interior privacy chamber. The privacy shield may also include a back panel. Alternatively, a back panel may be provided by another adjacent structure or object, such as a baby stroller. The top panel has a window with a movable flap cover for entry of light and viewing into the nursing chamber. Retractable drawstrings extending through seams of the panels allow for adjustment of the height and width of the nursing chamber. In at least one embodiment, the skeletal frame member defined by a spring biased element extends through a continuous sleeve along the peripheral edges of the fabric panels allowing the privacy shield to be collapsed under tension into a compact arrangement for transport and storage, and expanded in a "pop-open" action, wherein the frame member holds the arrangement of fabric panels taut in surrounding relation to a chamber. An arrangement of straps with releasable fasteners allows the privacy shield to be secured to a baby stroller, chair or other structure.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
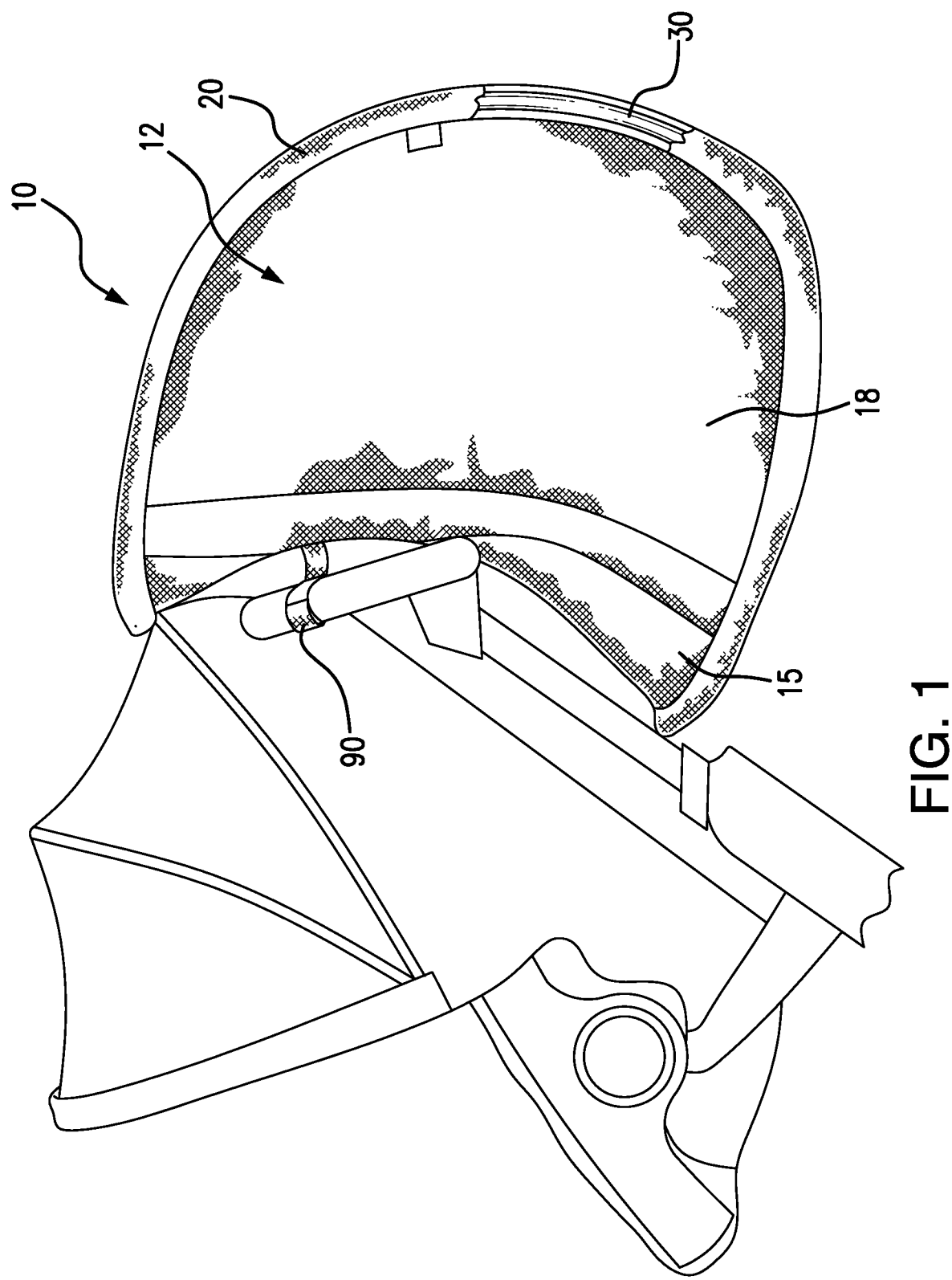
FIG. 1 is a side elevational view showing the privacy shield of the present invention secured to the handle of a baby stroller.

Referring to the several views of the drawings, the portable and collapsible privacy shield is shown and is generally indicated as 10. Referring to FIGS. 6-9, the privacy shield 10 includes a fabric enclosure 12 that is constructed in a manner to provide an arrangement of fabric panels including a top panel 14, a back panel 15 and opposite side panels 17,18. In at least one embodiment, the fabric enclosure further includes a continuous sleeve 20 formed along a free peripheral edge of the arrangement of fabric panels. The fabric enclosure 12 normally assumes an open and operable position, as seen in FIGS. 1-9 and 11-12, wherein the arrangement fabric panels are held taut.

Figure 4:
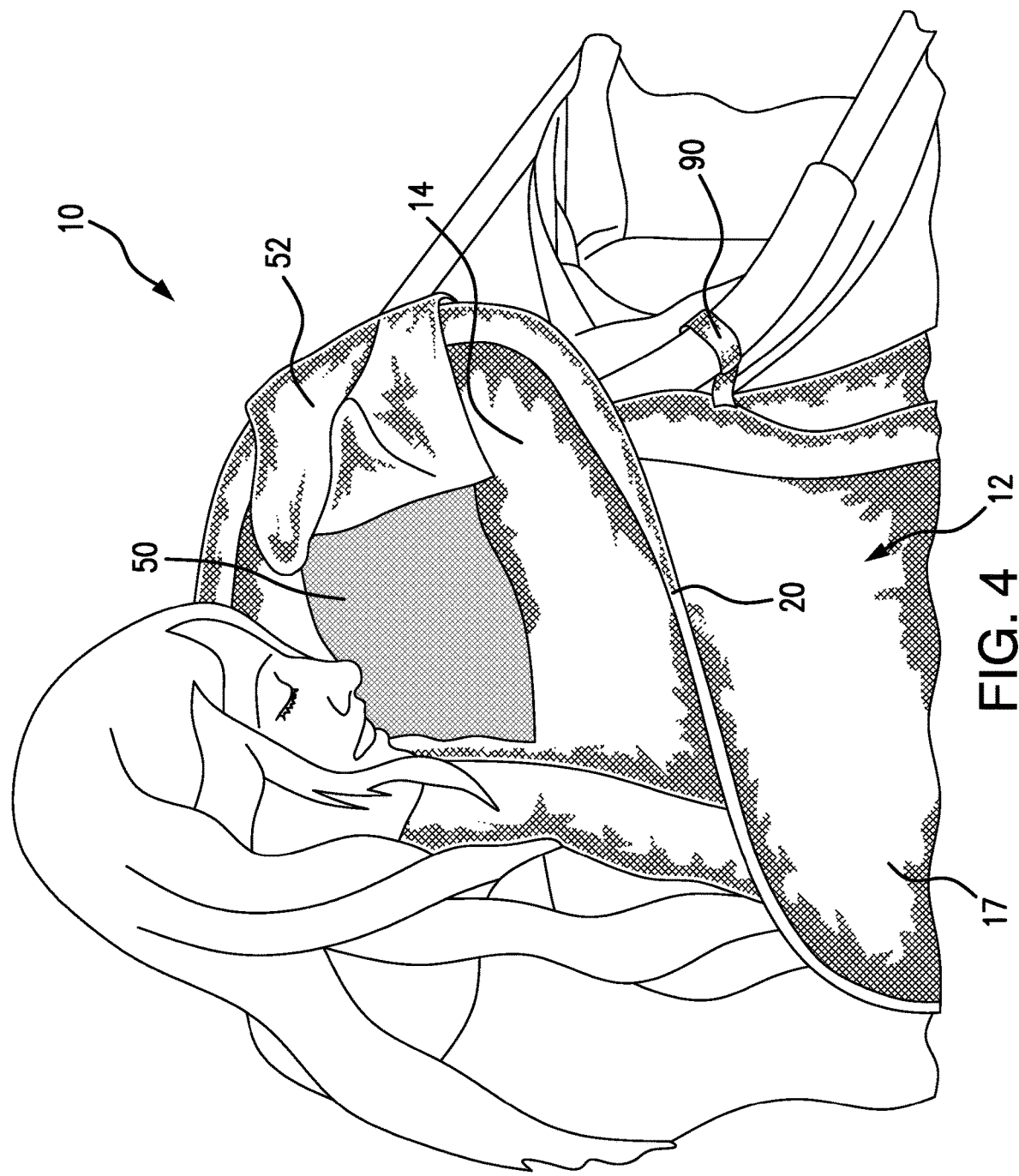
FIG. 4 is a top perspective view showing the privacy shield secured to a stroller and in use with a mother nursing a baby protectively shielded within a privacy chamber of the shield device.
Figure 5:
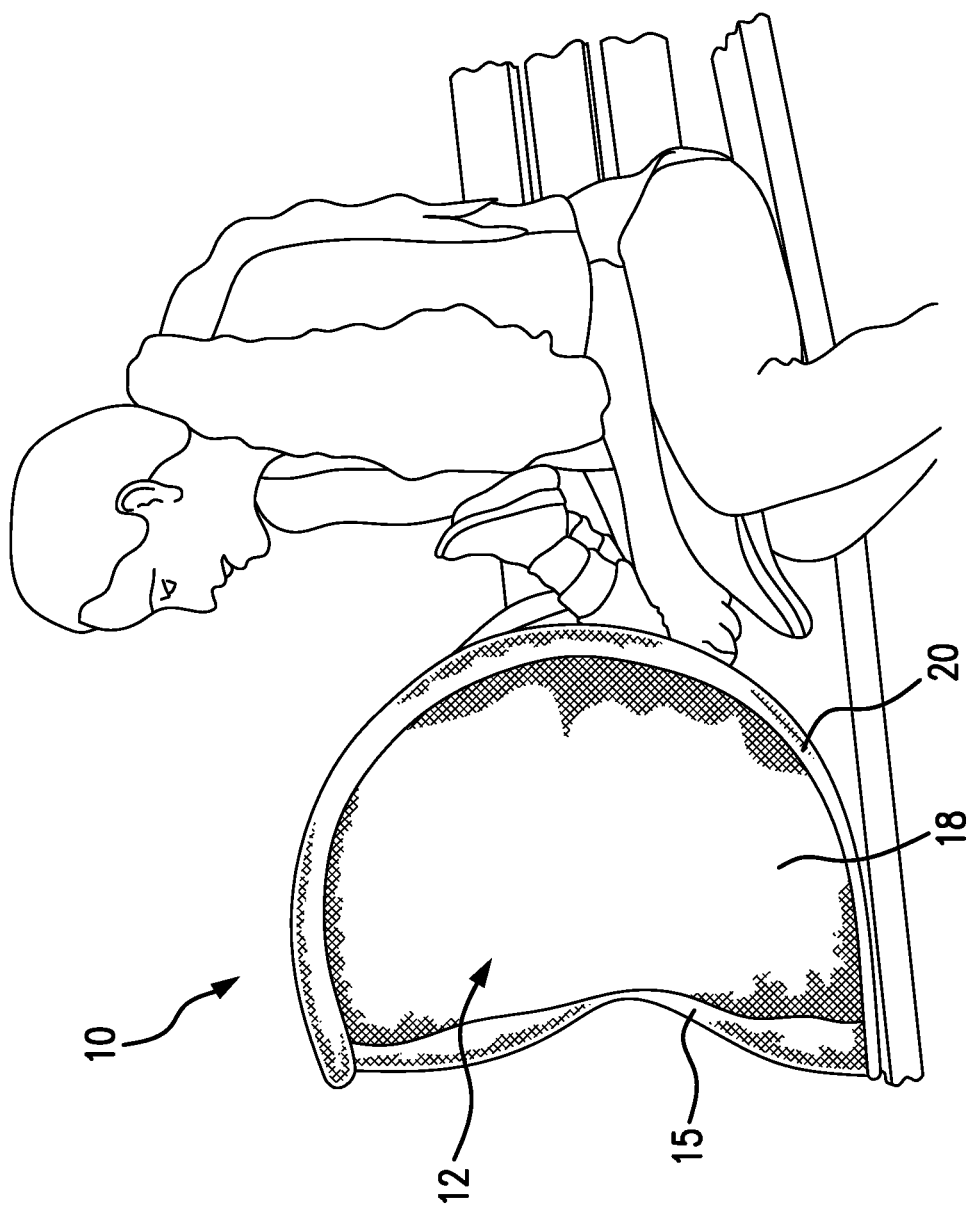
FIG. 5 is a side perspective view showing a mom changing a baby within the protected confines of the privacy shield of the present invention on a park bench.
Figure 6:
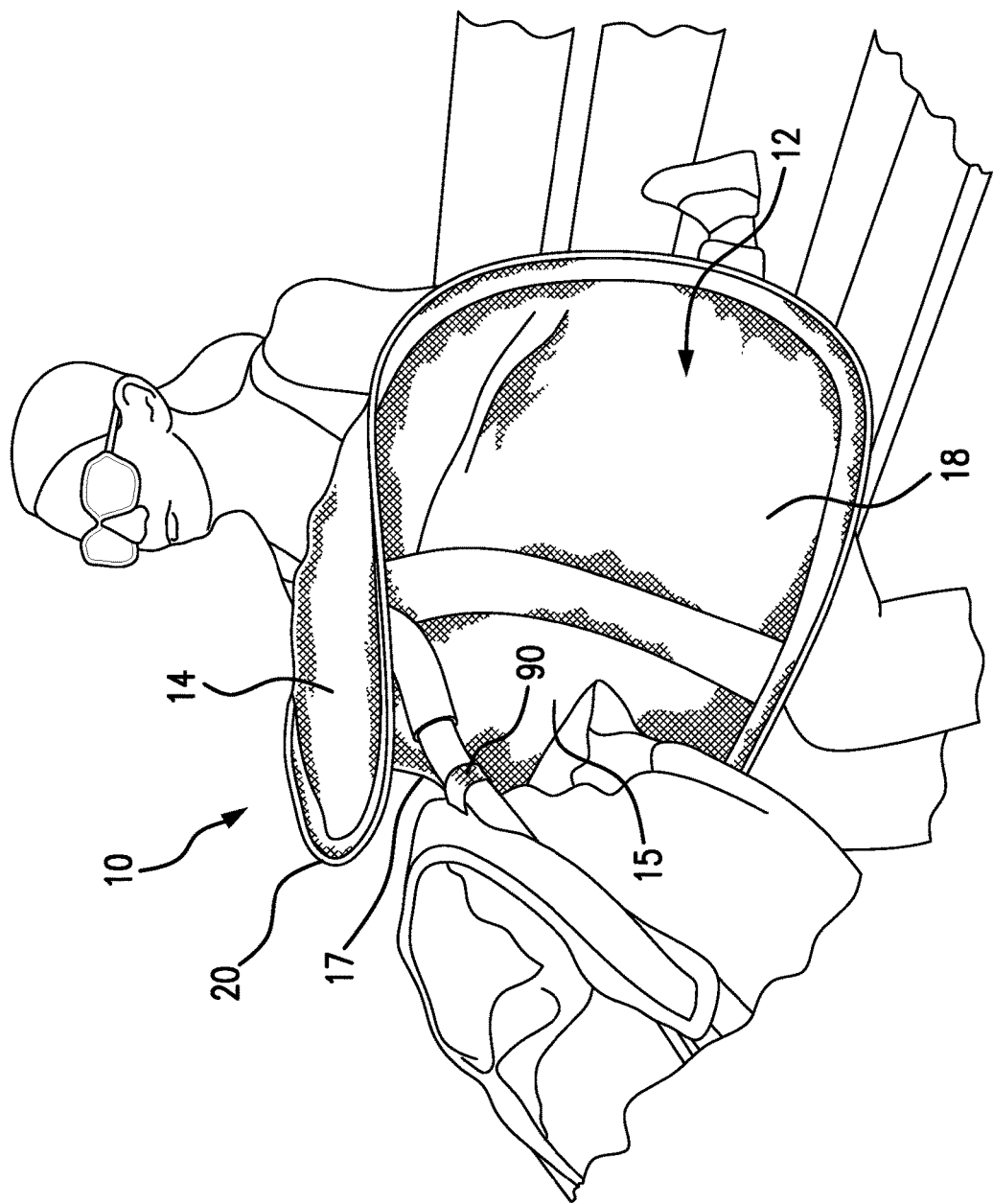
FIG. 6 is a front, side perspective view showing a mom nursing a baby within the protective and private confines of the privacy shield of the present invention while seated on a park bench with the privacy shield of the present invention secured to the handle of a baby stroller.
Figure 10:
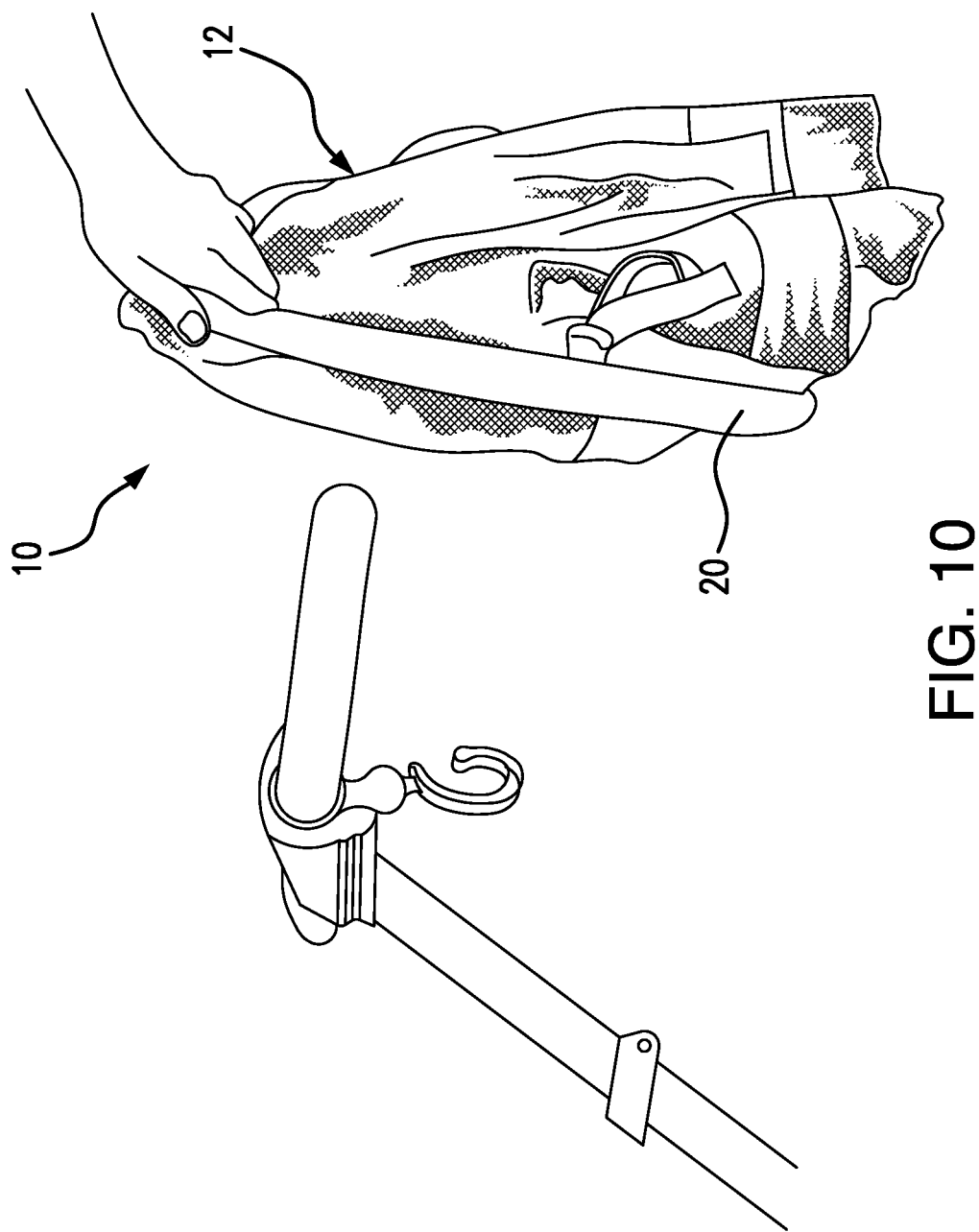
FIG. 10 is a side perspective view illustrating removal of the privacy shield from a baby stroller with the privacy shield shown in a collapsed position for transport and storage.

In the at least one embodiment of the invention, a skeletal frame member 30 is received within the continuous sleeve 20 that extends completely about the peripheral edge of the arrangement of fabric panels. In a preferred embodiment, the skeletal frame member is a spring biased wire element, fiberglass rod or plastic rod that exerts a force on the fabric enclosure that causes the fabric enclosure 12 to assume the operable position with the arrangement of fabric panels held taut, as seen in the drawings. The skeletal frame member 30 is structured to be manipulated in a manner that allows the fabric enclosure 12 to be collapsed so that the arrangement of panels are disposed in a stacked arrangement, as seen in FIG. 10. In this collapsed mode, the skeletal frame member 30 is under tension, so that it is urging the arrangement of panels to move back to the open, operable position. The arrangement held in the collapsed position and can be secured with a strap for storage and transport. When it is desired to use the portable privacy shield, the skeletal frame member is released from the collapsed mode, under tension, urging the arrangement of panels to the operable position, as the fabric enclosure 12 quickly enlarges in a pop-open action to assume the operable position. In the operable position, the arrangement of fabric panels are held taut and in surrounding relation to a privacy chamber with the opposite side panels 17,18 positioned in spaced apart relation on opposite sides of the privacy chamber. The top panel 14 spans between the opposite side panels above the privacy chamber, while the back panel 15 extends down from the top panel and spans between the opposite side panels 17,18. As seen in FIGS. 4-6, a mother can use the privacy shield 10 to nurse a baby or change a baby's diaper in a public venue without compromising privacy. In at least one other embodiment of the invention, the skeletal frame member 30 is eliminated. The back panel 15 may also be eliminated and provided by an adjacently positioned structure or object that is independent of the privacy shield, such as the back of a stroller.

Referring to FIG. 4, a window 50 in the top panel 14 allows the mother to view into the privacy chamber to ensure the baby is okay and properly positioned for breast feeding. The window preferably includes a mesh material to protectively cover the window area. A movable flap 52 allows the window to be covered when not in use.

Figure 7:
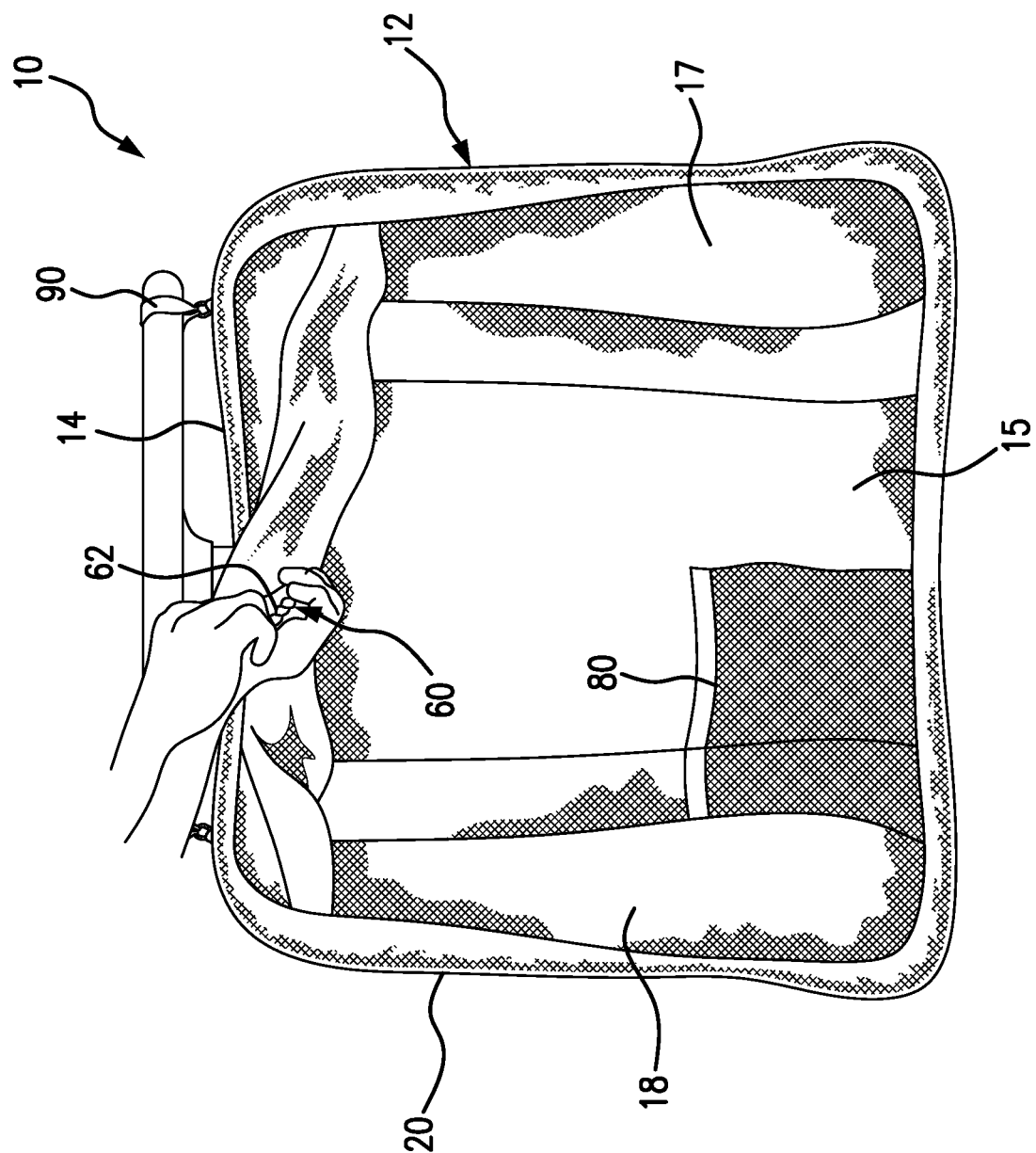
FIG. 7 is a front elevational view showing use of a drawstring mechanism for adjusting the transverse width of the inner privacy chamber of the shield device.
Figure 8:
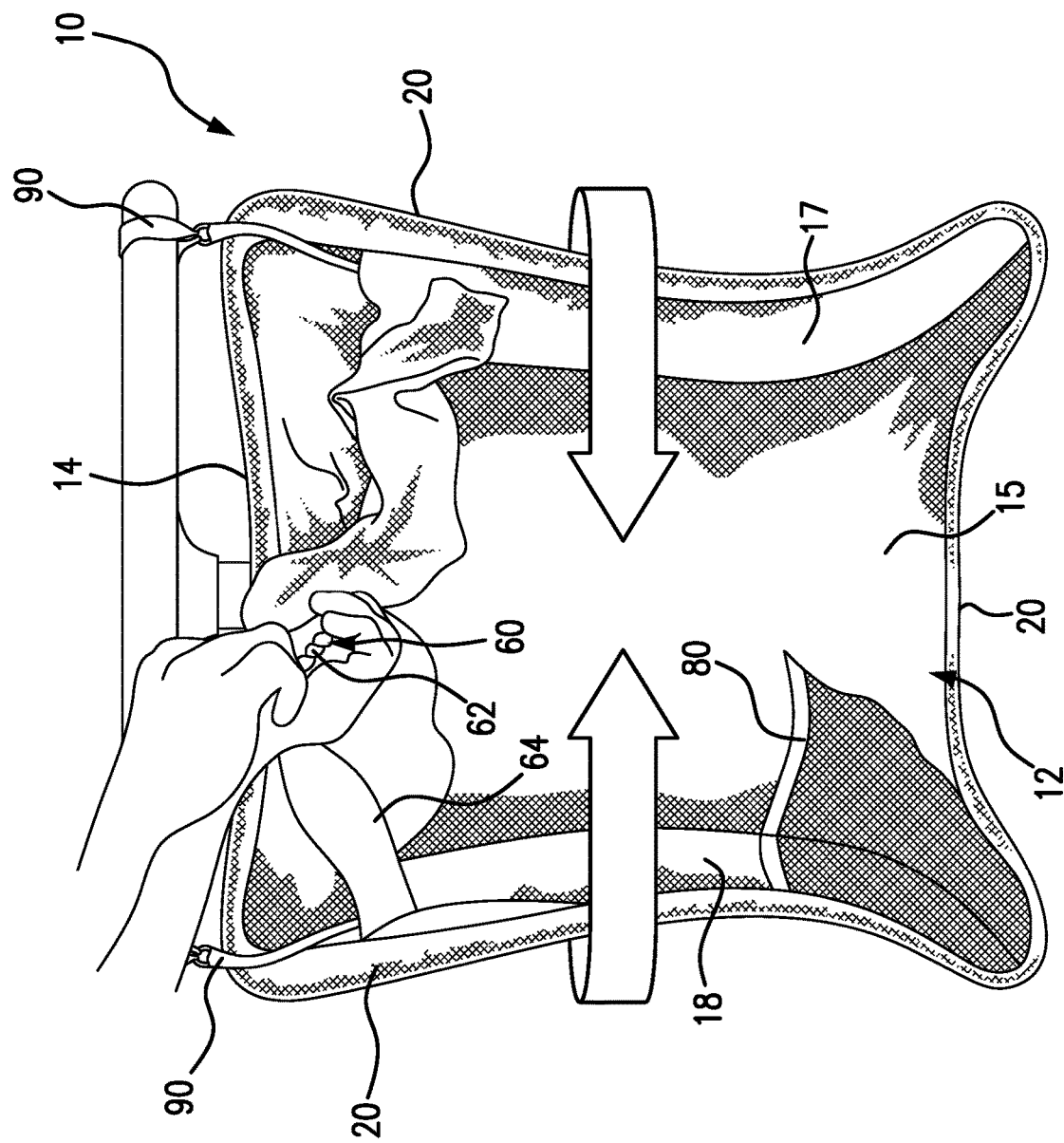
FIG. 8 is a front elevational view showing use of the drawstring adjustment feature and demonstrating the sides of the privacy shield pulled inwardly, as indicated by the arrows, to reduce the transverse width of the privacy chamber.
Figure 9:
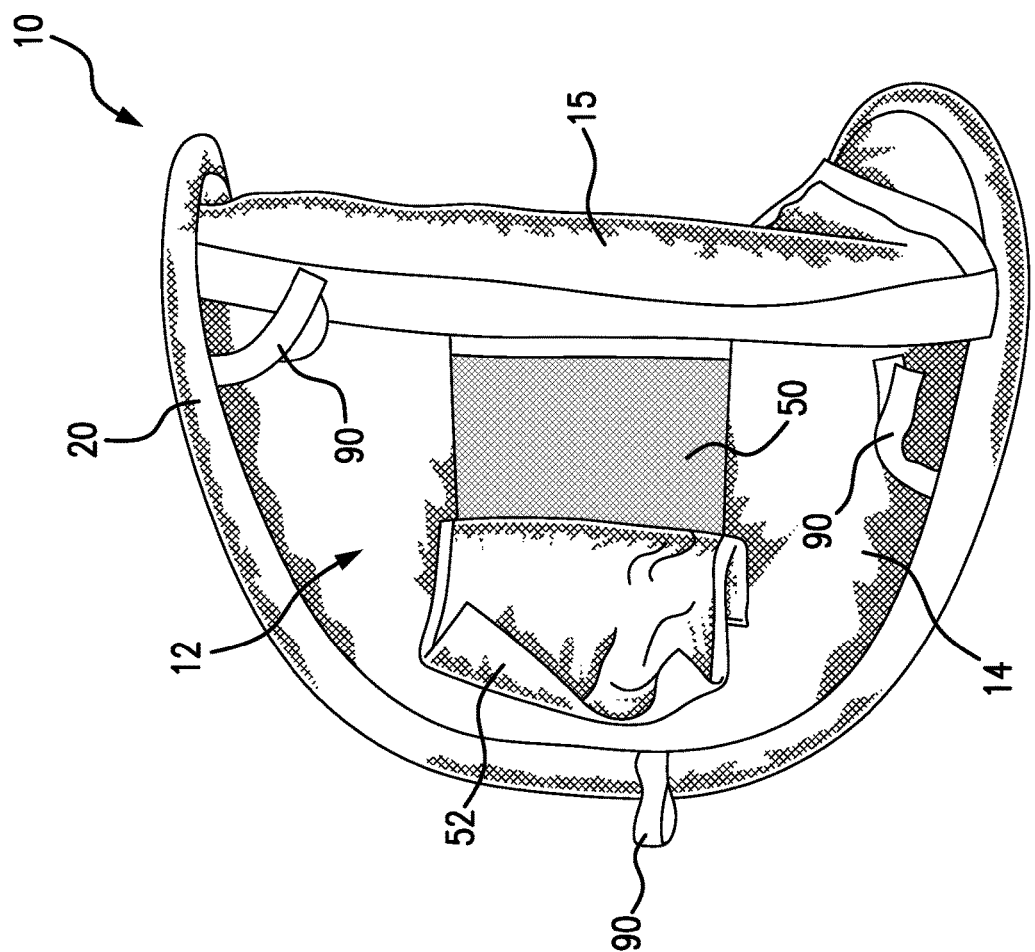
FIG. 9 is a top perspective view of the privacy shield of the present invention illustrating a mesh window and movable flap cover on the top panel of the privacy shield.

The portable privacy shield further includes adjustment mechanisms for adjusting the overall width of the privacy chamber, as well as the height of the privacy chamber. Specifically, a first adjustment mechanism 60 allows the side panels 17,18 to be pulled inwardly towards one another, as illustrated in FIGS. 7 and 8. In a preferred embodiment, the first adjustment mechanism includes a drawstring 62 that extends within a seam 64 along the top panel 14. The drawstring 62 connects to the opposite sides of the frame member 30, on the side extending along the top edge of the side panels. Upon pulling the free ends of the drawstring 62, the side panels 17,18 are urged inwardly towards one another, as illustrated by the arrows in FIG. 8. The drawstring 62 is held in the adjusted position by a spring loaded fastening device, such as a barrel fastener.

Figure 11:
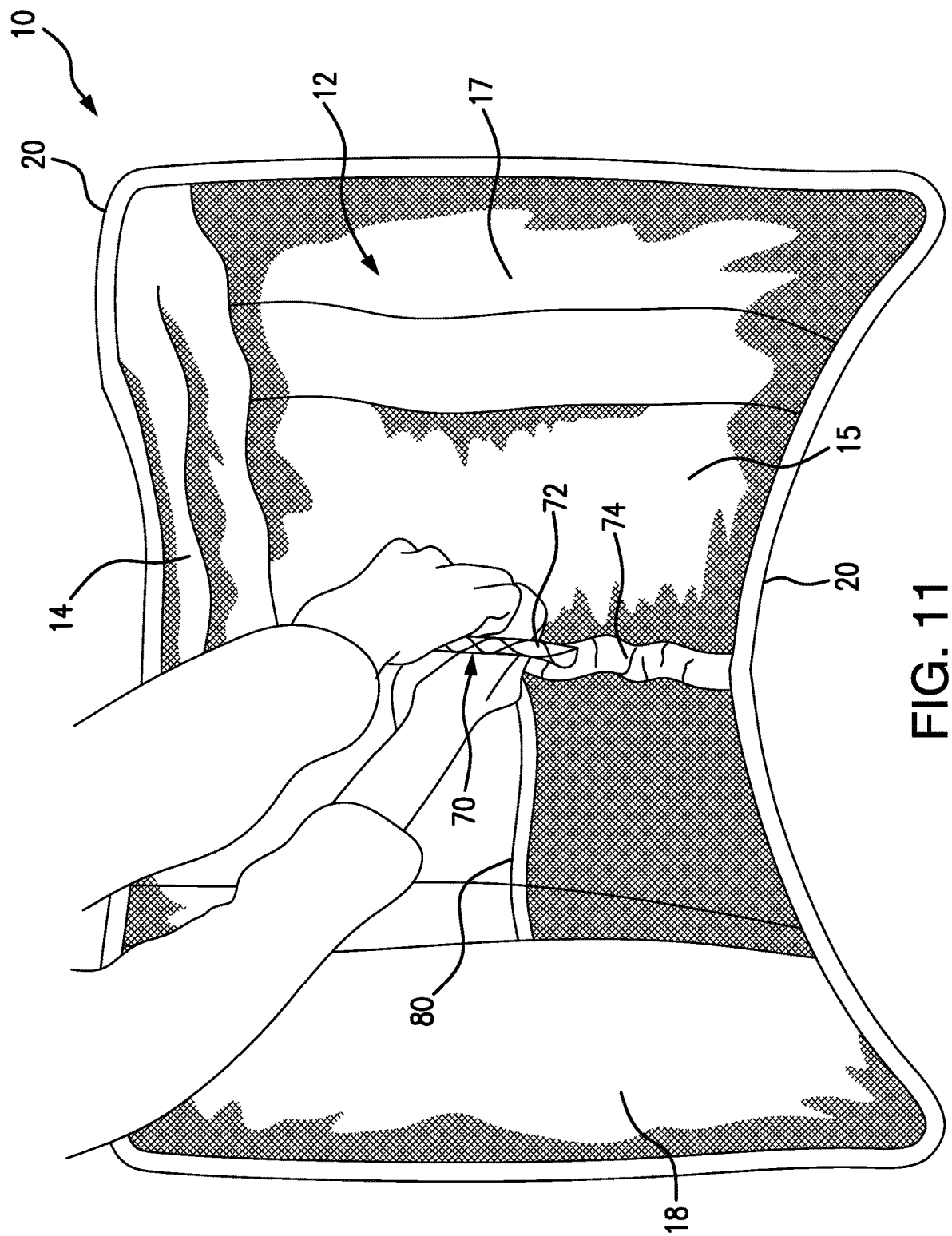
FIG. 11 is a front elevational view showing a further drawstring adjustment feature for adjusting the overall height of the interior privacy chamber.
Figure 12:
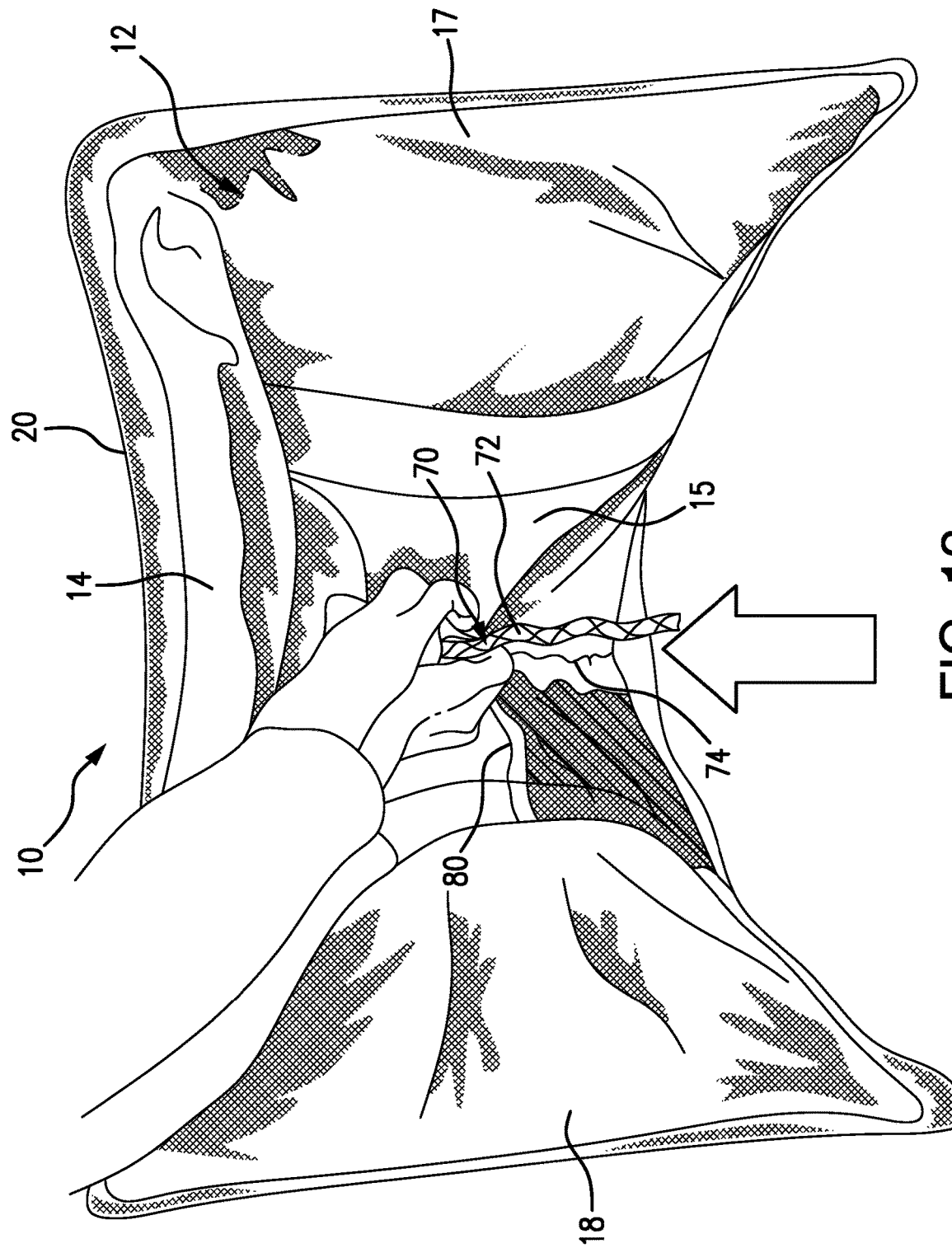
FIG. 12 is a front elevational view showing operation of the height adjusting drawstring mechanism with the bottom edge of the privacy shield being pulled upwardly, as indicated by the arrow, to thereby reduce the height of the privacy shield according to the needs of the user.

Referring to FIGS. 11 and 12, a second adjustment mechanism 70 allows for selective adjustment of the overall height of the privacy chamber. This particular adjustment is useful to accommodate mothers having varying size torsos, so that maximum privacy can be achieved, particularly when nursing a baby. In a preferred embodiment, the second adjustment mechanism 70 operates in the same fashion as the first adjustment mechanism. Specifically, a drawstring 72 extends within a seam 74 extending vertically on the back panel 15, with the drawstring 72 attached to the skeletal frame member 30 on both the top edge and the bottom edge of the back panel. Upon pulling the free ends of the drawstring 72, the top and bottom edges of the back panel 15 are pulled towards one another, as illustrated by the arrow in FIG. 12, which causes the overall height of the privacy chamber to be reduced. The drawstring 72 can be held in the adjusted position with a spring loaded fastening device, such as a barrel fastener.

The fabric enclosure may further be provided with one or more pockets. In a preferred embodiment, at least one pocket 80 is provided on the interior of the fabric enclosure, within the privacy chamber, as seen in FIGS. 7-8 and 11-12.

Figure 2:
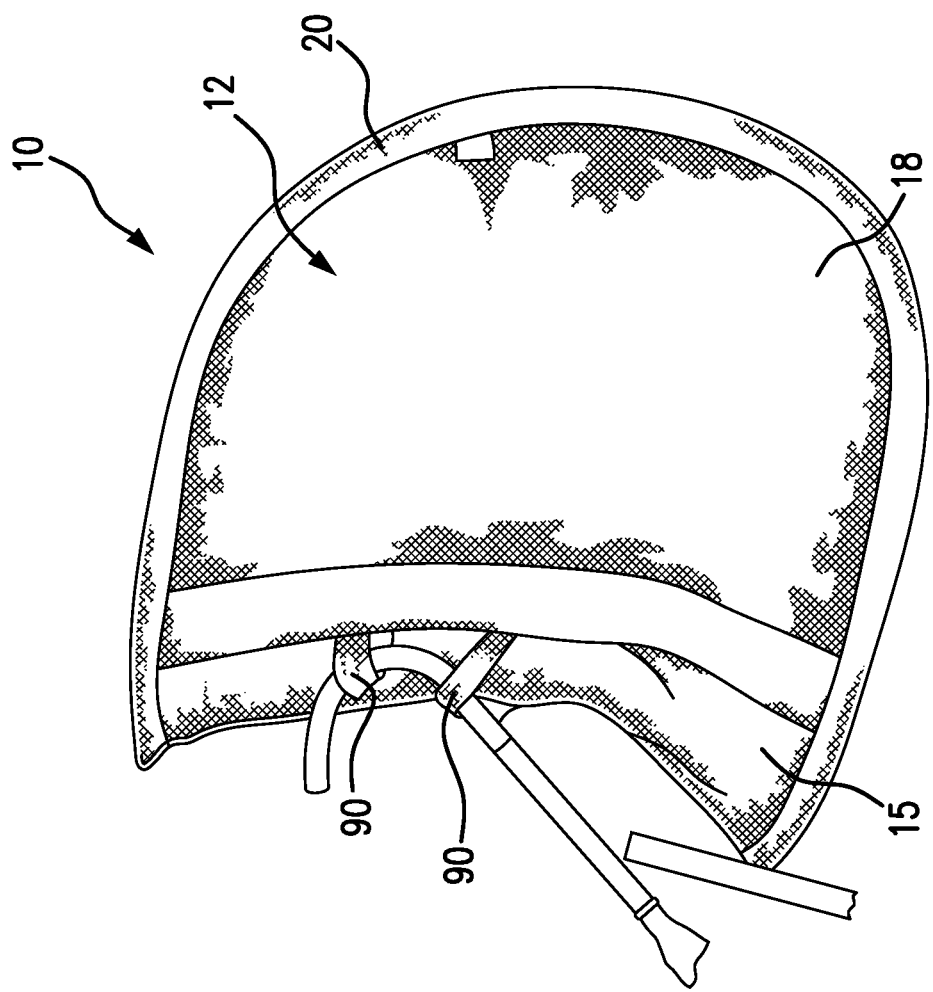
FIG. 2 is a side elevational view showing the privacy shield secured to the handle of a lightweight baby stroller.
Figure 3:
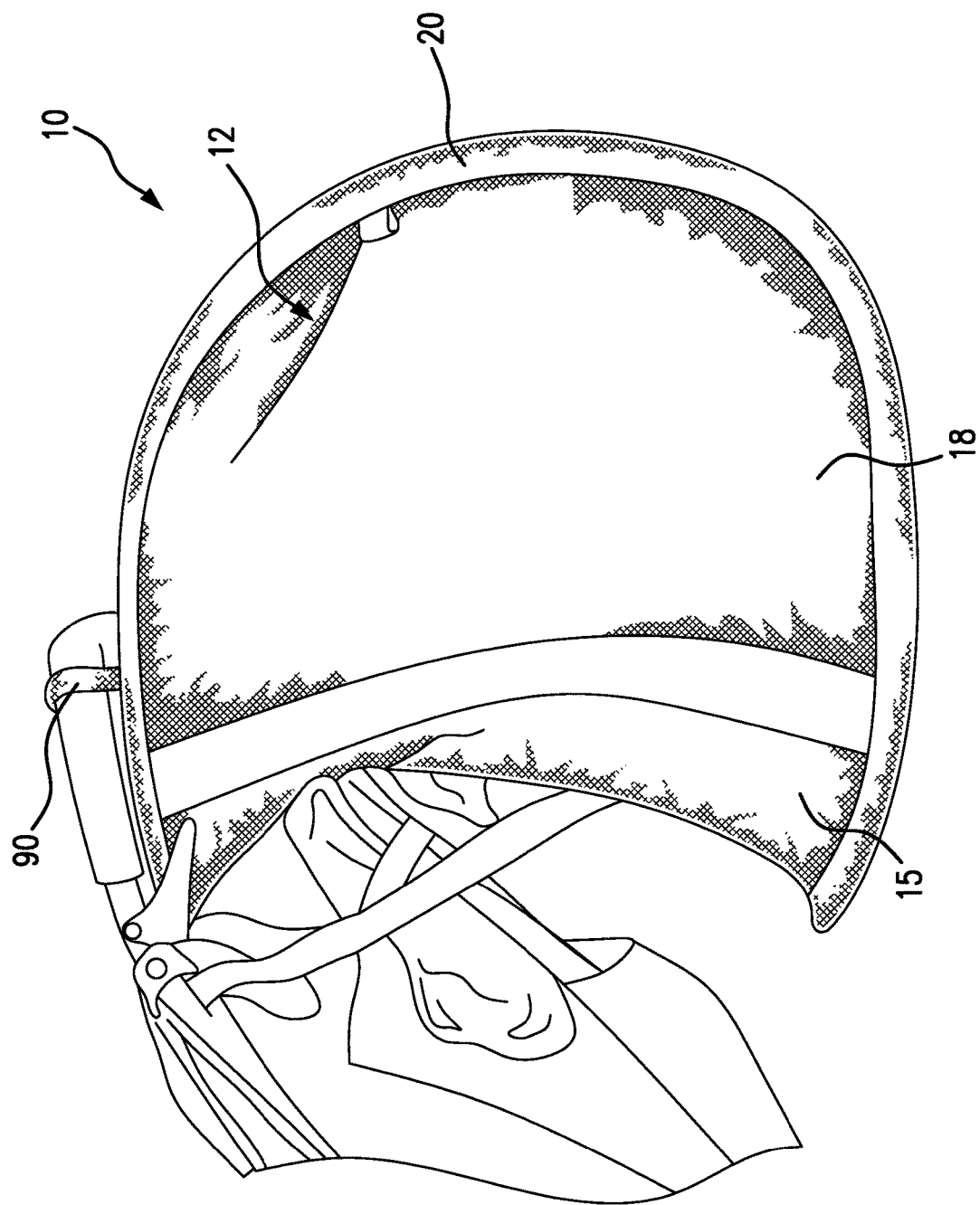
FIG. 3 is a side elevational view showing the privacy shield of the present invention secured to the handle of a jogger stroller.

Referring to FIGS. 1-3, the portable and collapsible privacy shield further includes an arrangement of strap members 90 with releasable fasteners, such as hook and loop fasteners, to allow the privacy shield to be removably attached to another structure, such as a baby stroller or chair. FIGS. 1-3 illustrate attachment of the privacy shield to various styles of baby strollers, wherein the arrangement of straps are used to secure the privacy shield to the handles and other frame structure of the baby stroller. Alternatively, the privacy shield can be placed on a flat surface, such as a table or bench, as seen in FIG. 5.

While the present invention has been shown in accordance with several preferred and practical embodiments, it is recognized that departures from the instant disclosure are fully contemplated within the spirit and scope of the present invention which is not to be limited except as defined in the following claims.

What is claimed is:

1. A portable privacy device comprising:
   a fabric enclosure having an arrangement of fabric panels including a top panel, a back panel and opposite side panels, and the fabric enclosure further including a continuous sleeve formed along a continuous free peripheral edge of the arrangement of fabric panels;
   a skeletal frame member defined by a spring biased element, and the spring biased element extending through the continuous sleeve and being structured and disposed to be manipulated to collapse the fabric enclosure under tension of the spring biased element in a collapsed mode so that the arrangement of panels are positioned in overlying stacked relation to one another, and the spring biased member being further structured and disposed to be released from tension in the collapsed mode to cause the fabric enclosure to enlarge in a pop-open action to assume an operable position with the arrangement of fabric panels held taut and in surrounding relation to a privacy chamber with the opposite side panels positioned in spaced apart relation on opposite sides of the privacy chamber and the top panel spanning between the opposite side panels above the privacy chamber, and the back panel extending down from the top panel and spanning between the opposite side panels;
   a window on the top panel for allowing viewing down into the privacy chamber from an exterior of the fabric enclosure;
   a first adjustment mechanism for selectively adjusting a distance of separation between the opposite side panels when the fabric enclosure is in the operable position, and the first adjustment mechanism including a drawstring that extends within a seam across the top panel, and the drawstring connecting to the skeletal frame member at a top of each of the opposite side panels, and the drawstring being structured and disposed to be pulled to thereby urge the opposite side panels inwardly towards one another, and the first adjustment mechanism further including a spring loaded fastening device for holding the drawstring at an adjusted position; and
   a second adjustment mechanism for selectively adjusting an overall height of the fabric enclosure when in the operable position, and the second adjustment mechanism including a drawstring extending within a seam on the back panel from a bottom edge of the back panel to a top edge of the back panel, and the drawstring being structured and disposed to pull the bottom edge and the top edge of the back panel towards one another upon pulling the drawstring, and the second adjustment mechanism further including a spring loaded fastening device for holding the drawstring in an adjusted position.

2. The portable privacy device as recited in claim 1 further including a plurality of strap members for releasable attachment to a supporting structure to hold the fabric enclosure on a structure.

3. The portable privacy device as recited in claim 2 wherein the structure is a baby stroller.

4. The portable privacy device as recited in claim 2 wherein the structure is a chair.

5. The portable privacy device as recited in claim 1 wherein the window includes a mesh material.

6. The portable privacy device as recited in claim 5 further comprising:
   a movable flap member for selectively covering and exposing the window.

7. The portable privacy device as recited in claim 1 further including at least one pocket on the fabric enclosure for storing articles therein.

8. A portable privacy device comprising:
   a fabric enclosure having an arrangement of fabric panels including a top panel, a back panel and opposite side panels, and the fabric enclosure further including a continuous sleeve formed along a continuous free peripheral edge of the arrangement of fabric panels;
   a skeletal frame member defined by a spring biased element, and the spring biased element extending through the continuous sleeve and being structured and disposed to be manipulated to collapse the fabric enclosure under tension of the spring biased element in a collapsed mode so that the arrangement of panels are positioned in overlying stacked relation to one another, and the spring biased member being further structured and disposed to be released from tension in the collapsed mode to cause the fabric enclosure to enlarge in a pop-open action to assume an operable position with the arrangement of fabric panels held taut and in surrounding relation to a privacy chamber with the opposite side panels positioned in spaced apart relation on opposite sides of the privacy chamber and the top panel spanning between the opposite side panels above the privacy chamber, and the back panel extending down from the top panel and spanning between the opposite side panels;
   a window on the top panel for allowing viewing down into the privacy chamber from an exterior of the fabric enclosure; and
   an adjustment mechanism for selectively adjusting a distance of separation between the opposite side panels when the fabric enclosure is in the operable position, and the adjustment mechanism including a drawstring that extends within a seam across the top panel, and the drawstring connecting to the skeletal frame member at a top of each of the opposite side panels, and the drawstring being structured and disposed to be pulled to thereby urge the opposite side panels inwardly towards one another, and the adjustment mechanism further including a spring loaded fastening device for holding the drawstring at an adjusted position.

* * * * *